(12) United States Patent
Funaki et al.

(10) Patent No.: US 7,691,306 B2
(45) Date of Patent: Apr. 6, 2010

(54) METHOD FOR PRODUCING TRANSPARENT POLYPROPYLENE BASED SHEET AND TRANSPARENT POLYPROPYLENE BASED SHEET

(75) Inventors: Akira Funaki, Sodegaura (JP);
Masahiro Akamatsu, Hanyuu (JP);
Shigeki Yamaguchi, Sodegaura (JP);
Kenichi Mori, Sodegaura (JP);
Tomoyuki Kitajima, Sodegaura (JP)

(73) Assignee: Idemitsu Unitech Co., Ltd., Tokyo (JP)

( * ) Notice: Subject to any disclaimer, the term of this patent is extended or adjusted under 35 U.S.C. 154(b) by 615 days.

(21) Appl. No.: 10/594,126

(22) PCT Filed: Mar. 24, 2005

(86) PCT No.: PCT/JP2005/005406

§ 371 (c)(1),
(2), (4) Date: Sep. 25, 2006

(87) PCT Pub. No.: WO2005/092593

PCT Pub. Date: Oct. 6, 2005

(65) Prior Publication Data

US 2007/0210480 A1    Sep. 13, 2007

(30) Foreign Application Priority Data

Mar. 26, 2004   (JP)   ............... 2004-092597

(51) Int. Cl.
B29C 47/88 (2006.01)
B28B 3/20 (2006.01)
C08L 23/00 (2006.01)
C08L 23/04 (2006.01)

(52) U.S. Cl. .................. 264/211.12; 264/211.2; 264/211.13; 264/211.18; 264/176.1; 525/240; 525/191

(58) Field of Classification Search .......... 264/210.5, 264/211.12, 211.2, 211.13, 211.18, 176.1; 525/240, 191
See application file for complete search history.

(56) References Cited

U.S. PATENT DOCUMENTS

| | | | |
|---|---|---|---|
| 6,329,454 B1 * | 12/2001 | Krabbenborg | 524/252 |
| 6,403,719 B1 * | 6/2002 | Tanaka et al. | 525/191 |
| 2001/0036544 A1 * | 11/2001 | Hori et al. | 428/220 |
| 2002/0019488 A1 * | 2/2002 | Seelert et al. | 525/240 |
| 2002/0037979 A1 * | 3/2002 | Job et al. | 526/119 |
| 2003/0176580 A1 * | 9/2003 | Seelert et al. | 525/240 |
| 2003/0191215 A1 * | 10/2003 | Miller et al. | 524/249 |
| 2003/0212193 A1 * | 11/2003 | Maruyama et al. | 524/543 |

FOREIGN PATENT DOCUMENTS

| | | |
|---|---|---|
| JP | 58-25341 A | 2/1983 |
| JP | 1-306448 A | 12/1989 |
| JP | 6-81698 B2 | 10/1994 |
| JP | 6-81796 B2 | 10/1994 |
| JP | 9-29818 A | 2/1997 |
| JP | 11-156921 A | 6/1999 |
| JP | 2002-144505 A | 5/2002 |
| JP | 2003-170485 A | 6/2003 |
| JP | 2003170485 * | 6/2003 |

OTHER PUBLICATIONS

Fujii Junji et al. "Patent Abstracts of Japan: Polypropylene Resin Composition and Production of Sheet Comprising Same" Pub No. 01-299851 Pub Date:Dec. 4, 1989.
Wada Isao "Patent Abstracts of Japan: Polyproylene Resin Composition, and Container and Medicinal Appliance Made of the Same" Pub No. 2000-386492 Pub Date: Dec. 20, 2000.
Chisso Corp. "Patent Abstracts of Japan: Calendering Polypropylene Based Composition" Pub No. 2001-114950 Pub Date: Apr. 24, 2001.
Tokuyama Corp. "Patent Abstracts of Japan: Manufacture of Polypropylene Sheet" Pub No. 2000-246785 Pub Date: Sep. 12, 2000.
Fuji Junji et al. "Patent Abstracts of Japan: Polypropylene Resin Composition and Production of Sheet Comprising Same" Pub No. 01-299851 Pub Date: Dec. 4, 1989.
Wada Isao "Patent Abstracts of Japan: Polyproylene Resin Composition, and Container and Medicinal Appliance Made of the Same" Pub No. 2002-105257 Pub Date: Apr. 10, 2002.

* cited by examiner

Primary Examiner—Vasu Jagannathan
Assistant Examiner—Irina Krylova
(74) Attorney, Agent, or Firm—Millen, White, Zelano & Branigan, P.C.

(57) ABSTRACT

The present invention relates to a transparent polypropylene based sheet and its manufacturing method capable of: providing proper properties as a transparent sheet such as tensile characteristic, impact resistance, rigidity and little generation of whitening when being folded as well as maintaining transparency; preventing generation of a gum-like material in molding; and realizing continuous production. A manufacturing machine 1 includes: an extruding unit 11 for melting and kneading a raw material and extruding the material into a sheet-like shape; a first cooling unit 12 for cooling the melted sheet-like resin composition 20a to obtain a sheet (sheet-like article) 20; a preheating unit 13 for reheating the sheet 20; a heat treatment unit 14 for heat-treating the sheet-like resin composition 20; and a second cooling unit 15 for cooling the heat-treated sheet 20. The raw material of a resulting sheet 21 contains a polypropylene resin (a) and a metallocene-type ethylene-α-olefin copolymer (b).

18 Claims, 4 Drawing Sheets

METHOD FOR PRODUCING TRANSPARENT POLYPROPYLENE BASED SHEET AND TRANSPARENT POLYPROPYLENE BASED SHEET

TECHNICAL FIELD

The present invention relates to a manufacturing method of a transparent polypropylene based sheet and the transparent polypropylene based sheet.

BACKGROUND ART

In an industrial field of transparent sheets, there has been widely used a polyvinylchloride sheet having good transparency and moldability as well as being inexpensive. On the other hand, in recent years, the use of the polyvinylchloride sheets has been being restricted due to increasing awareness of environmental issues, and there has been a demand for a new transparent sheet substituting for the polyvinylchloride sheet.

As a substitute for the polyvinylchloride sheet, a sheet made of a polypropylene has been attracting attentions. However, since the polypropylene is a crystalline resin, it might not provide sufficient transparency. Since the transparent sheet is typically used in an application for packaging various articles, the transparent sheet as a sheet base material is required to be excellent in various properties other than the transparency as a basic property.

As the various properties, the transparent sheet is required to exhibit high impact resistance especially at a low temperature and a little whitening in folding processing. As for the impact resistance at a low temperature, when, for instance, the transparent sheet is applied to folded boxes which are carried in a low-temperature area, a cushioning material has conventionally been used to prevent breakage of the folded boxes, which was very costly. Accordingly, there has been a strong demand for improving the impact resistance of the sheet itself at a low temperature Attempts have been made in various fields to improve the transparency and the impact resistance of a transparent polypropylene based sheet. For example, there has been proposed a method for obtaining a sheet using a so-called quenching method in which a polypropylene resin containing a homopolypropylene (HPP) and a low crystalline resin is melt-extruded and quenched.

Such technology may include: a method in which a polypropylene resin containing a homopolypropylene (HPP) and an ethylene-butene-1 copolymer is melt-extruded and then quenched to obtain a sheet (see, for instance, Patent Document 1); and a method using a polypropylene resin composition containing a homopolypropylene (HPP), a low density ethylene-butene-1 copolymer and a nucleating agent (see, for instance, Patent Document 2). Incidentally, as the latter method, there may also be known a method using a polypropylene resin containing a homopolypropylene (HPP) and a random polypropylene (RPP) (see, for instance, Patent Document 3).

There has also been proposed a method in which a homopolypropylene (HPP) containing a linear low-density polyethylene (L-LDPE) is used as a polypropylene resin, which is melt-extruded and then quenched (see, for instance, Patent Document 4); and a method in which a polypropylene resin composition containing a low crystalline polypropylene is quenched and heat-treated (see, for instance, Patent Document 5).

Meanwhile, as a method for improving the rigidity and the transparency of the transparent polypropylene based sheet, there has been known a method for obtaining a sheet in which a nucleating agent, an aliphatic or an alicyclic petroleum resin, etc. are added to a raw material of a polypropylene (see, for instance, Patent Document 6).

[Patent Document 1] JP-B-6-81698
[Patent Document 2] JP-B-6-81796
[Patent Document 3] JP-A-1-306448
[Patent Document 4] JP-A-9-29818
[Patent Document 5] JP-A-2003-170485
[Patent Document 6] JP-A-58-25341

DISCLOSURE OF THE INVENTION

Problems to be Solved by the Invention

Although the methods disclosed in Patent Documents 1 to 4 in the technologies described above are effective in improving the impact resistance, it entails degradation of the rigidity of the sheet. In addition, the methods might adversely affect the transparency. Further, there is a production problem in which a resin-like deposit (i.e., a so-called gum-like material) is deposited on die lips and the like in molding the sheet, which impedes continuous production. There are also problems such as degradations in transparency, appearance and printability due to generation of a gel in recycling the sheet as well as whitening in folding processing, so that the transparent sheet obtained by the methods does not have appropriate properties.

With the method disclosed in Patent Document 5, a notable effect on the transparency of the sheet cannot be obtained, and in addition, the impact resistance is degraded. With the method disclosed in Patent Document 6, there arises a new problem in which contamination caused by bleeding of additives occurs in addition to the problems described above. As described above, a transparent sheet having satisfactory properties cannot be obtained with the conventional technologies.

An object of the present invention is to provide a manufacturing method of a transparent polypropylene based sheet and the transparent polypropylene based sheet, the transparent polypropylene based sheet having various properties required as a transparent sheet such as further-enhanced transparency, tensile characteristic, impact resistance, rigidity and whitening-free in folding processing as a secondary processing, and the manufacturing method being capable of preventing a so-called gum-like material in molding the transparent sheet and realizing continuous production.

Means for Solving the Problems

According to an aspect of the present invention, a manufacturing method of a transparent polypropylene based sheet that uses a resin composition containing: 70 to 99.8 mass % of a polypropylene resin (a) having an isotactic pentad fraction of 0.85 to 0.99 and a melt flow rate (MFR) of 0.1 to 30 g/10 min; and 30 to 0.02 mass % of a metallocene-type ethylene-α-olefin copolymer (b) that is produced using a metallocene catalyst and having a density of 880 to 920 kg/m$^3$ and a melt flow rate (MFR) of 1 to 30 g/10 min includes: a melt extrusion step for melt-extruding the resin composition into a sheet-like shape; a cooling step for quenching the melt-extruded sheet-like resin composition to obtain a sheet-like article; and a heat treatment step for heat-treating the quenched sheet-like article at a heat treatment temperature of 100 to 220° C.

In the manufacturing method according to the aspect of the invention, the resin composition containing the above-described specific polypropylene resin (a) and metallocene-type ethylene-α-olefin copolymer (b) is melt-extruded, quenched and heat-treated. With the arrangement, a transparent polypropylene based sheet having impact resistance (including impact resistance at a low temperature) and rigidity can be obtained while securing the transparency. In addition, the obtained transparent polypropylene based sheet is free from generation of whitening in folding processing as a secondary processing.

Especially, addition of the metallocene-type ethylene-α-olefin copolymer (b) (metallocene LL) to materials of the sheet is effective in enhancing the transparency. Addition of even a small adding amount of the metallocene-type ethylene-α-olefin copolymer (b) is effective, while addition of 10 mass % does not degrade the rigidity. Accordingly, when the rigidity is especially required and therefore the adding amount is reduced, the transparency can be enhanced, while when the transparency is desired to be enhanced with higher priority and therefore the adding amount is increased, degradation of the rigidity can be avoided.

Since the method includes the heat treatment step for heat-treating the sheet-like article at the heat treatment temperature of 100 to 220° C., the rigidity can be enhanced. In addition, selection of the heat treatment allows the surface of the sheet-like article to be flattened and provided with mirror finish with the sheet-shape thereof being maintained, thereby realizing a proper surface condition of the sheet.

According to the aspect of the invention, a so-called gum-like material is prevented from being generated in molding, thereby realizing proper continuous-production of the sheet. In addition, contamination problem caused by bleeding of additives is quite small.

In the manufacturing method according to the aspect of the present invention, the polypropylene resin (a) and the metallocene-type ethylene-α-olefin copolymer (b) do not preferably contain a nucleating agent.

The nucleating agent has a nucleating effect for accelerating crystallization speed. In reheating and molding, crystallization proceeds up to a predetermined shape and the shape is fixed, which might adversely affect moldability. According to the aspect of the invention, the polypropylene resin (a) and the metallocene-type ethylene-α-olefin copolymer (b) as raw materials do not contain the nucleating agent, thereby properly maintaining moldability in a secondary heat-molding of the transparent polypropylene based sheet.

In the manufacturing method according to the aspect of the present invention, it is preferable that the cooling step includes at least one of: quenching the melt-extruded sheet-like resin composition by allowing the sheet-like resin composition to pass through a slit through which cooling water flows; and quenching the melt-extruded sheet-like resin composition by allowing the sheet-like resin composition sheet to travel between and in contact with a cooling roller and an endless belt.

According to the aspect of the invention, in a case where the cooling step uses the slit, the melt-extruded sheet-like resin composition is quenched by passing the sheet-like resin composition through the slit through which the cooling water flows. With the arrangement, since the cooling water can directly cool the sheet-like resin composition passing through the slit to obtain the sheet-like article, the sheet-like resin composition can be effectively cooled and solidified into the sheet-like article and the obtained sheet-like article is free from distortion in its sheet shape. In a case where the cooling step uses the endless belt, quenching is performed while pressing the sheet-like resin composition with the cooling roller and the endless belt, thereby effectively manufacturing the polypropylene based sheet with surface gloss, excellent transparency and removed distortion.

In the manufacturing method according to the aspect of the present invention, the heat treatment step includes holding front and back surfaces of the sheet-like article with a metallic endless belt and/or a metallic roller to heat the sheet-like article, the metallic endless belt and/or the metallic roller having a mirror-finished surface.

According to the aspect of the invention, the heat treatment step is performed by heating the sheet-like article with its front and back sides held by the mirror-finished metallic endless belt and/or metallic roller. With the arrangement, heat can be transferred to the sheet-like article easily and effectively, and since a surface on which the sheet-like article abuts is the mirror-finished surface, the surface of the sheet-like article can be properly mirror-finished.

As another heat treatment method, the cooled sheet-like article may be introduced in a medium having an ambient temperature of 100 to 220° C. to be heat-treated. In such case, the ambient temperature is preferably 130 to 200° C. The medium may be a gas inactive with the polypropylene, such as air and nitrogen, and the air is typically used. As another method, one side of the sheet-like article is heat-treated with the endless belt and/or the roller and the other side thereof is heat-treated by applying the medium (e.g., the air) having the ambient temperature of 100 to 220° C.

According to another aspect of the present invention, a transparent polypropylene based sheet comprises a resin composition containing: 70 to 99.8 mass % of a polypropylene resin (a) having an isotactic pentad fraction of 0.85 to 0.99 and a melt flow rate (MFR) of 0.1 to 30 g/10 min; and 30 to 0.02 mass % of a metallocene-type ethylene-α-olefin copolymer (b) that is produced using a metallocene catalyst and having a density of 880 to 920 kg/m³ and a melt flow rate (MFR) of 1 to 30 g/10 min, in which: a tensile modulus of elasticity of an extruding direction (MD direction) is 1500 MPa or higher; and a total haze H is represented by Equation (I) below with a thickness of the sheet being t [mm].

$$H \leq 70t^2 - 30t + 6 \quad (I)$$

According to the aspect of the present invention, the transparent polypropylene based sheet attains the above-described advantages, thereby providing high quality polypropylene based sheet having various properties as a transparent sheet such as excellent transparency, tensile characteristic, impact resistance (including impact resistance at a low temperature) and rigidity as well as whitening-free in the folding processing as a secondary processing.

Since specific ranges are set for the tensile modulus of elasticity and the haze, the polypropylene base sheet with increased rigidity and transparency can be provided.

Especially, addition of the metallocene-type ethylene-α-olefin copolymer (b) (metallocene LL) is effective in enhancing the transparency. Addition of even a small adding amount of the metallocene-type ethylene-α-olefin copolymer (b) is effective, while addition of 10 mass % hardly degrades the rigidity. Accordingly, when the rigidity is especially required and therefore the adding amount is reduced, the transparency can be enhanced, while when the transparency is desired to be enhanced with higher priority and therefore the adding amount is increased, degradation of the rigidity can be avoided.

In the transparent polypropylene based sheet according to the aspect of the present invention, when the total haze H is represented by Equation (II) shown below with the thickness of the sheet being t [mm], the above-described advantages can be attained more properly.

$$H \leq 70t^2 - 30t + 5.2 \quad (II)$$

In the transparent polypropylene based sheet according to the aspect of the present invention, it is preferable that an impact resistance at −5° C. is 2000 J/m or higher.

According to the aspect of the present invention, since a specific range is set for the impact strength at −5° C., the transparent polypropylene based sheet that exhibits excellent impact strength in a low temperature area can be obtained, which is suitable as a packaging material used in a low temperature environment, i.e., a packaging body that is transported and stored at a low temperature.

Figure 1:
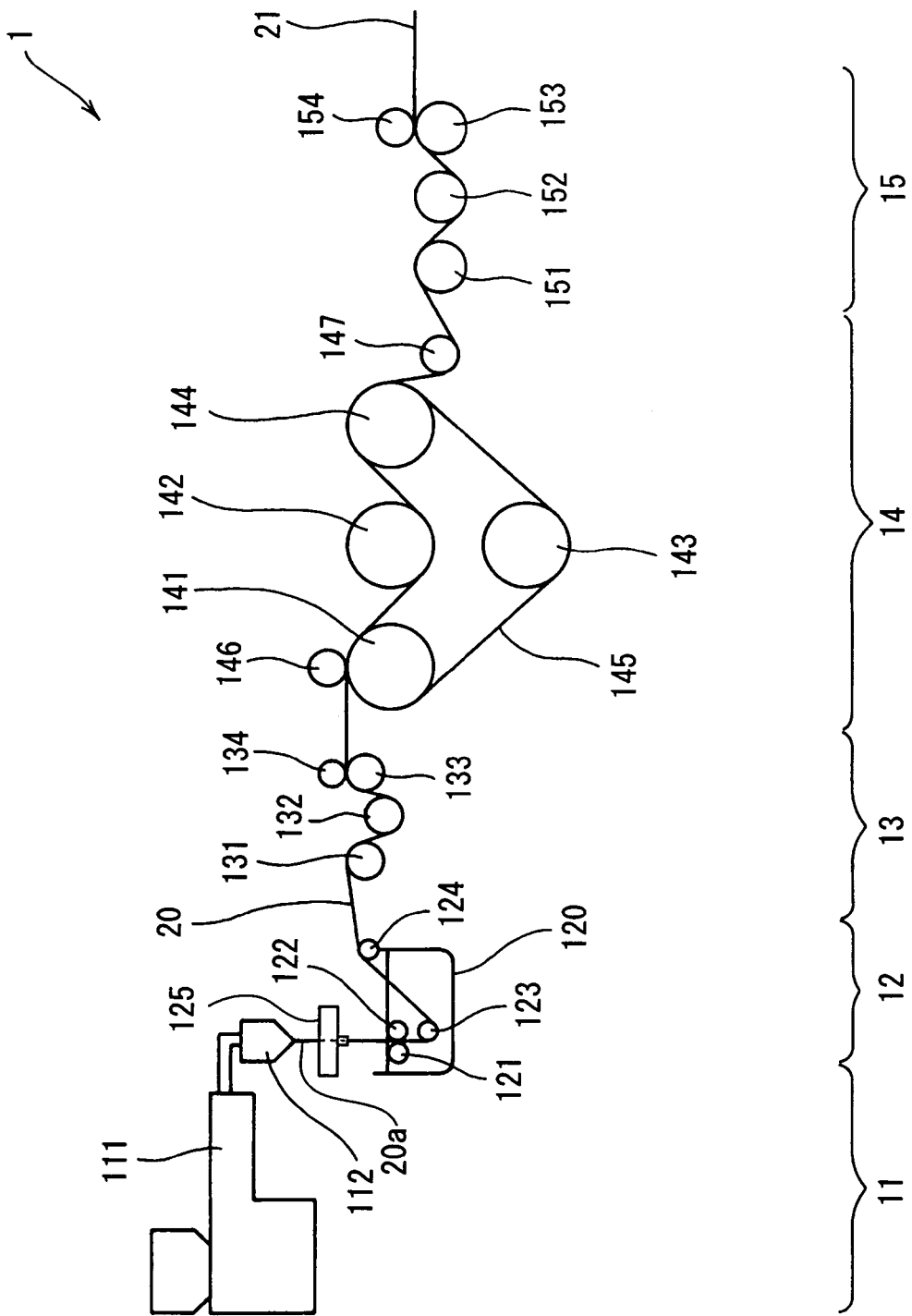
FIG. 1 is a diagram showing an outline of a manufacturing machine according to a first embodiment of the present invention.

EXPLANATION OF CODES 1, 2: manufacturing machine
11: extruding unit
12, 22: cooling unit
14: heat treatment unit
20: sheet
20a: sheet-like resin composition
21: sheet (transparent polypropylene based sheet)
111: extruder
112: T-die
120: large bath
125: small bath
126: slit
141, 142, 143: heating roller
144: cooling roller
145, 215: endless belt
213, 214, 215A, 216: cooling roller

BEST MODE FOR CARRYING OUT THE INVENTION

In a manufacturing method of a transparent polypropylene based sheet of the present invention, a resin composition containing a polypropylene resin (a) and a metallocene-type ethylene-α-olefin copolymer (b) having arrangements described below is used.

[Polypropylene Resin (a)]

As the polypropylene resin (a), a high crystalline polypropylene resin having an isotactic fraction of 0.85 to 0.99, preferably 0.88 to 0.99, is used. With the isotactic fraction within the above-described range, a sheet having excellent crystallinity, tensile characteristic and impact resistance can be obtained. In addition, a balance between these properties and the transparency is maintained properly. When the isotactic pentad fraction is below 0.85, the tensile modulus of elasticity might be degraded. On the other hand, when the isotactic pentad fraction exceeds 0.99, an internal haze in a quenching step is degraded, which might make the resulting sheet unsuitable as a transparent polypropylene based sheet.

The isotactic pentad fraction used in the present invention is a method introduced by A. Zambelli et al in "Macromolecules, 6,925 (1973)". The isotactic pentad fraction is an isotactic fraction in a pentad unit contained in a polypropylene molecule chain, which is measured by a method using $^{13}$C-NMR. In other words, the isotactic pentad fraction is a fraction of a propylene monomer unit existing in the center of a chain of five continuous propylene monomer units that are continuously liked by a meso-bond. However, an attribution of peak is based on a method described in "Macromolecules, 8,687 (1975)".

Specifically, an isotactic pentad unit is measured as an intensity fraction of a peak mmmm in all absorption peaks in a methyl carbon region of $^{13}$C-NMR spectrum.

The melt flow rate (MFR) of the polypropylene resin (a) is 0.1 to 30 g/10 min. When the MFR is below the above-described range, flow defect might occur in molding the sheet, which causes variation in thickness of the sheet. On the other hand, when the MFR exceeds the above-described range, the melt tension becomes insufficient, which lowers the viscosity and causes drawdown to likely occur in molding the sheet, thereby resulting in degradation of extrusion moldability.

Incidentally, the melt flow rate (MFR) of the polypropylene resin (a) can be measured in compliance with JIS K 7210.

A content of the polypropylene resin (a) is in the range from 70 to 99.8 mass % in the total amount of the resin composition, preferably 70 to 97 mass %, and particularly preferably 75 to 95 mass %. When the content is below 70 mass %, the heat resistance and the rigidity might not be sufficient, while when the content exceeds 99.8 mass %, improvement of the transparency and the impact resistance might not be sufficient, either of which is not preferable.

[Metallocene-Type Ethylene-Alpha-Olefin Copolymer (b)]

The metallocene-type ethylene-α-olefin copolymer (b) is an ethylene-α-olefin copolymer produced using a metallocene catalyst.

Specifically, an α-olefin as a comonomer of the ethylene-α-olefin copolymer is an α-olefin preferably having a carbon number of 3 to 18, more preferably 4 to 12, and particularly preferably 6 to 10. More specifically, examples of the α-olefin may include a propylene, a butane-1, a pentene-1, a hexane-1, an octane-1, a heptene-2, a 4-methylpentene-1, a 4-methylhexane-1 and a 4,4-dimethylpentene-1.

The density of the metallocene-type ethylene-α-olefin copolymer (b) is in the range from 880 to 920 kg/m$^3$, preferably 900 to 915 kg/m$^3$. When the density is in the above range, proper flexibility and crystallinity are ensured. When the density is below the range, bleeding of a low-crystalline component might be likely generated. On the other hand, when the density exceeds the range, the transparency and the impact resistance of the sheet might become insufficient.

For example, when the density of the metallocene-type ethylene-α-olefin copolymer (b) becomes high, e.g., 919 kg/m$^3$, the transparency might be adversely affected.

Incidentally, the density of the metallocene-type ethylene-α-olefin copolymer (b) may be measured in compliance with JIS K 7112 (23° C.).

The melt flow rate (MFR) of the metallocene-type ethylene-α-olefin copolymer (b) is 1 to 30 g/10 min. When the MFR is below the above-described range, flow defect might occur in molding the sheet, which causes variation in thickness of the sheet. On the other hand, when the MFR exceeds the above-described range, the viscosity becomes low and drawdown likely occurs in molding the sheet, thereby causing insufficient molding stability.

Incidentally, the MFR of the metallocene-type ethylene-α-olefin copolymer (b) can be measured in compliance with JIS K 7210.

A content of the metallocene-type ethylene-α-olefin copolymer (b) is in the range from 30 to 0.02 mass % in the total amount of the resin composition, preferably 3 to 30 mass %, and particularly preferably 5 to 25 mass %. When the content is below 0.02 mass %, improvement of the transparency and the impact resistance might not be sufficient, while when the content exceeds 30 mass %, the heat resistance and the rigidity might not be sufficient, either of which is not preferable.

The ethylene-α-olefin copolymer (b) can be produced from the above-described comonomer using a known metallocene catalyst. A method for copolymerization using the metallocene catalyst may be exemplified by a gas phase method, a slurry method, a high-pressure ionic polymerization and a solution method.

Such metallocene catalyst may typically be formed from: a metallocene catalyst component (A) constituted from a transition metal compound of group IVB of the periodic table which has at least one ligand having a cyclopentadienyl skeleton; and an organic aluminum oxy compound catalyst component and/or an ionic compound catalyst component (B); a fine particle carrier (C); an organic aluminum compound catalyst component (D); and an ionized ionic compound catalyst component (E), the components (C) to (E) being added as needed.

Incidentally, the metallocene-type ethylene-α-olefin copolymer has a characteristic in which a molecular weight distribution ($M_w/M_n$) obtained by a GPC (Gel Permeation Chromatography) method is in the range from 1.5 to 4.0, which is a narrow distribution.

The polypropylene resin (a) and the metallocene-type ethylene-α-olefin copolymer (b) constituting the transparent polypropylene based sheet of the present invention do not preferably contain a nucleating agent. The nucleating agent has a nucleating effect for accelerating crystallization speed. In heat-melting and molding, crystallization proceeds up to a predetermined shape and the shape is fixed, which might adversely affect moldability in molding the sheet. With the arrangement in which the polypropylene resin (a) and the metallocene-type ethylene-α-olefin copolymer (b) as raw materials do not contain the nucleating agent, moldability in manufacturing the transparent polypropylene based sheet can be maintained properly.

The resin composition constituting the transparent polypropylene based sheet of the present invention may also contain known olefin-containing copolymers for sheet molding such as an ethylene in an amount of 10 mass % or less, a random polypropylene containing α-olefin having a carbon number of 4 or more in addition to the above-described resin materials as essential components as long as advantages of the present invention are not impeded. Also, the resin composition may contain known additives for sheet molding such as an antistatic agent, a lubricant, an ultraviolet absorber, a light stabilizer and a colorant as long as the advantages of the present invention are not impeded.

[Molding to Heat-Treatment]

A manufacturing method of the polypropylene based sheet of the present invention includes: a melt-extrusion step for melt-extruding a resin composition formed from the above-described specific polypropylene resin (a) and metallocene-type ethylene-α-olefin copolymer (b) into a sheet-like shape; a cooling step for quenching the melt-extruded sheet-like resin composition; and a heat treatment step for heat-treating a cooled sheet-like article at a heat treatment temperature of 100 to 220° C.

Here, in the melt-extrusion step, the resin composition is melt-extruded into sheet-like shape to obtain a sheet-like resin composition. A melt-extrusion method in the melt-extrusion step is not particularly limited, and, for example, a T-die extrusion method may preferably be employed.

In the cooling step, the shape of the sheet-like resin composition is temporarily fixed. A cooling method in the cooling step may be water-cooling, air-cooling and a cooling method using an endless belt or a roller. Among these, the water-cooling or the cooling method using the endless belt and the roller in combination are preferable. Especially, water-cooling using a slit through which cooling water flows or a cooling method in which the sheet-like resin composition is quenched by passing it through between and in contact with a cooling roller and an endless belt.

In the method using the endless belt and the cooling roller in combination, the melt-extruded sheet-like resin composition is introduced in between the endless belt wound around a first cooling roller and a second cooling roller and a third cooling roller disposed outside the endless belt so as to pass through therebetween in a manner contacting with surfaces of the endless belt and the third roller, where the introduced sheet-like resin composition is pressed and quenched by the first cooling roller and the third cooling roller via the endless belt. In such case, by mirror-finishing at least one of the surface of the third cooling roller and the surface of the endless belt which contact with the sheet-like resin composition, the polypropylene based sheet with excellent surface gloss, transparency and removed distortion can be manufactured effectively.

In the heat treatment step, known methods may be employed without any particular limitation as long as the heat treatment temperature is in the range from 100 to 220° C.

In the heat treatment step, a proper surface finishing can be provided to a surface of the resin composition which has been temporally solidified as the sheet-like article. In the heat treatment step, the heat treatment can be performed using an endless belt, a roller or the like.

As for temperature condition of the heat treatment, in an arrangement using a heat treatment device that contacts with the sheet-like resin composition such as an endless belt, a roller and a platy heater, a surface contacting the sheet-like resin composition in the heat treatment device is in the range from 100 to 220° C., preferably in the range from 100° C. to the melting point of the polypropylene resin (a) contained in the resin composition.

A heat treatment time is not particularly limited as long as the heat treatment temperature does not exceed the melting point of the polypropylene resin (a). However, in a case where the heat treatment temperature exceeds the melting point of the polypropylene resin (a), the heat treatment time should be 1 minute or shorter, preferably 1 to 30 seconds. When the heat treatment is performed too long, the productivity of the sheet degrades, and in addition, the sheet is gradually cooled after being melted and crystallization proceeds, which might cause the resulting sheet to be whitened.

By employing a mirror-finished endless belt and/or roller for such heat treatment, the surface of the sheet can be flattened and mirror-finished with the shape of the sheet being maintained, and the surface can be finished with proper surface gloss.

As another heat treatment method, the cooled sheet-like article may be heat-treated by putting it in a medium having ambient temperature of 100 to 220° C. More preferably, the ambient temperature is 130 to 200° C.

In such case, gasses such as the air and nitrogen may be used as the medium, and the air is typically used. Any heat treatment device can be used without particular limitation as long as the device has a heater or the like for heating the medium (e.g., air) and a space in which the cooled sheet is accommodated or through which the sheet is passed through without contacting the heater. Typically, an oven, a constant-temperature bath, a tenter and the like may be used as the heat treatment device.

An embodiment of the manufacturing method of the transparent polypropylene based sheet of the present invention will be described below with reference to the attached drawings.

First Embodiment

FIG. 1 shows a manufacturing machine 1 of a transparent polypropylene based sheet according to a first embodiment of the present invention.

The manufacturing machine 1 includes: an extruding unit 11 for melting and kneading a resin composition as a raw material and extruding the resin composition into a sheet-like resin composition 20a; a first cooling unit 12 for cooling and solidifying the extruded sheet-like resin composition 20a; a preheating unit 13 for reheating a sheet-like article (sheet 20) as the cooled sheet-like resin composition; a heat treatment unit 14 for heat-treating the sheet 20 to obtain a sheet 21; and a second cooling unit 15 for cooling the heat-treated sheet 20.

The extruding unit 11 includes: an existing extruder 111 such as a single screw extruder and a multi-screw extruder; and a T-die 112 for sheet molding that is provided to a tip end of the extruder 111. With the arrangement, the melted and kneaded resin composition containing 70 to 99.8 mass % of the polypropylene resin (a) and 30 to 0.02 mass % of the metallocene-type ethylene-α-olefin copolymer (b) is extruded into a sheet-like shape by the T-die 112.

A form of the raw material to be melt-extruded into the sheet-like resin composition 20a may be palletized, powdery, granular, etc., which may be arbitrarily selected, and the raw material is blended with the above-described content ratio.

The resin composition may also contain other known olefin-containing copolymers for sheet molding such as an ethylene in an amount of 10 mass % or less and a random polypropylene containing an α-olefin having a carbon number of 4 or more. Also, the resin composition may contain known additives for sheet molding such as an antistatic agent, a lubricant, an ultrasonic absorber, a light stabilizer and a colorant.

The first cooling unit 12 includes: a large bath 120; a first roller 121 and a second roller 122 for holding the melt-extruded sheet-like resin composition 20a therebetween, the first roller 121 and the second roller 122 disposed oppositely to each other in the large bath 120; a third roller 123 disposed more closely to a bottom surface side of the large bath 120 as compared to the rollers 121, 122; a fourth roller 124 disposed in the vicinity of an edge on the preheating unit 13 side of the large bath 120; and a small bath 125 disposed above the large bath 120.

Figure 2:
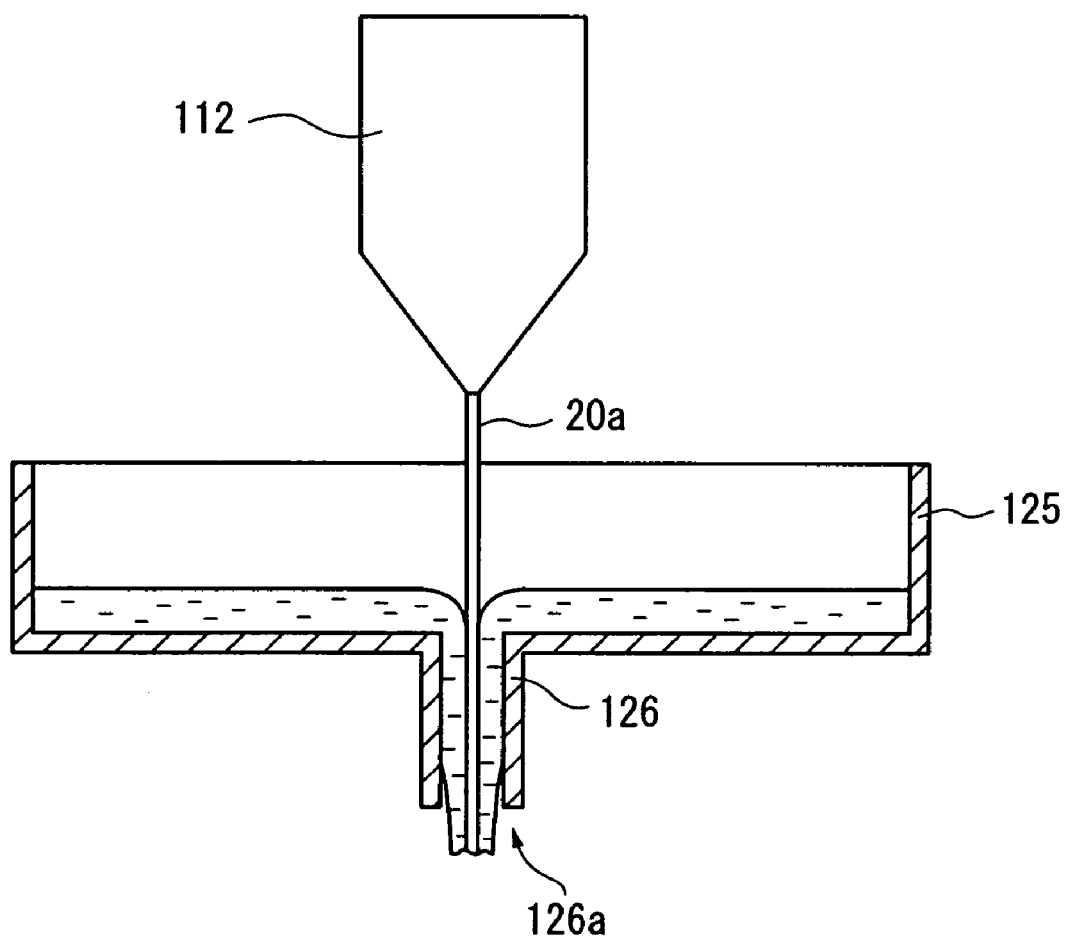
FIG. 2 is an enlarged view of a small bath of the first embodiment.

As shown in FIG. 2, a slit 126 is formed substantially at the center of the bottom surface of the small bath 125, the slit 126 formed at a position and with a size corresponding to an opening of the T-die 112.

Note that FIG. 2 shows an arrangement in which the slit 126 is formed perpendicularly to the bottom surface of the small bath 125.

The width of an inlet of the slit 126 is in the range from 1 to 20 mm, preferably 3 to 10 mm. The width of an outlet of the slit 126 is at least larger than the thickness of the sheet-like resin composition 20a and 0.5 mm or larger, preferably 1.0 mm or larger. Incidentally, the slit 126 is typically formed like a wall having a thickness of about 1 to 10 mm and a length of about 30 to 70 mm. A distance between the slit 126 and the T-die 112 is typically about 30 to 250 mm.

Although not shown, the small bath 125 is so arranged that cooling water or the like for cooling the melt-extruded sheet-like resin composition 20a is constantly fed from the outside by a pump or the like so that the water level is maintained.

With the arrangement, the sheet-like resin composition 20a extruded by the extruding unit 11 passes through the slit 126 downward with the cooling water that is constantly fed to the small bath 125, introduced by rotations of the rollers 121, 122, 123 into the large bath 120, and then cooled and solidified to be the sheet 20.

Figure 3:
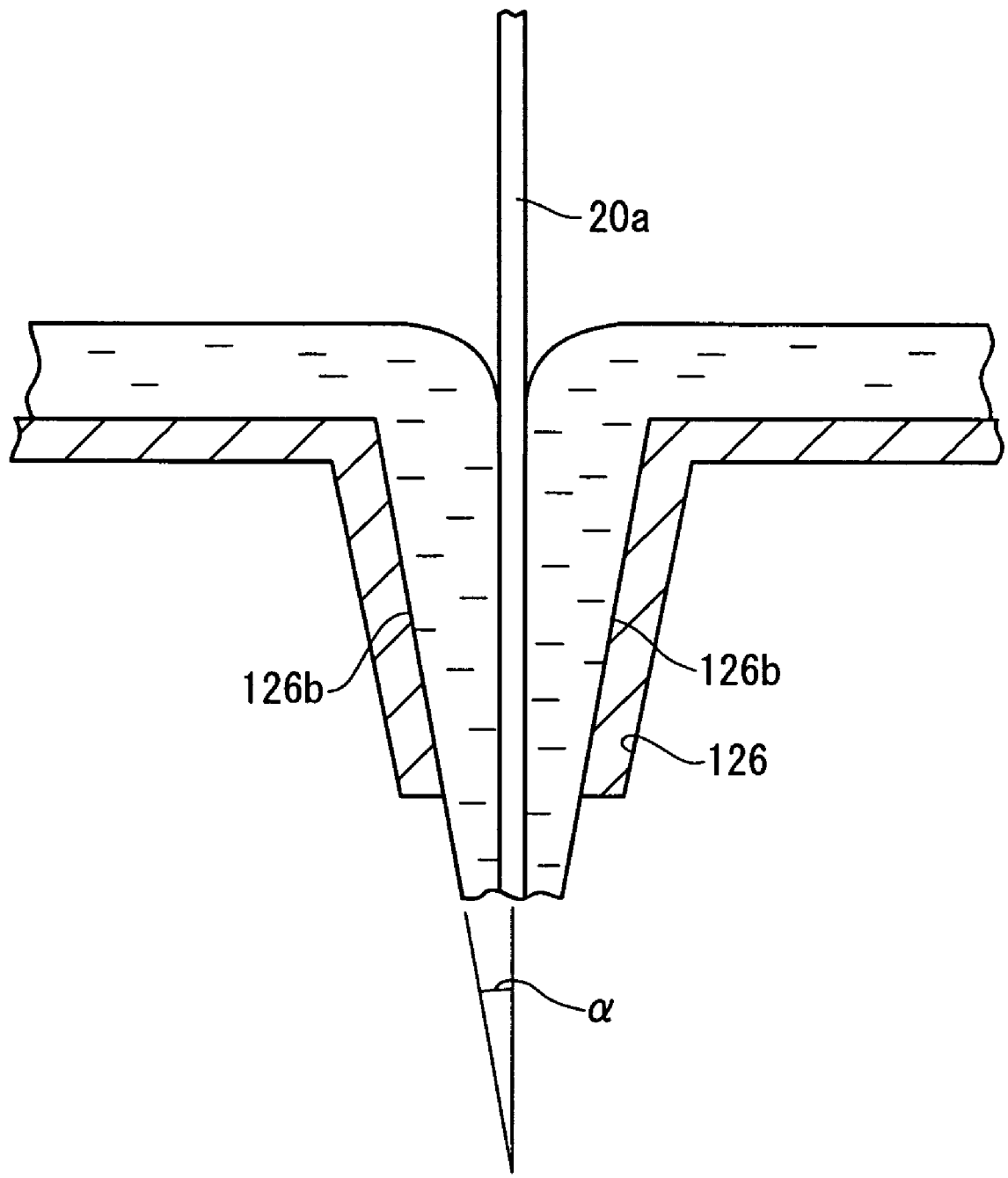
FIG. 3 is a partially-enlarged view showing another aspect of FIG. 2.

Although the slit 126 is formed perpendicularly to the bottom surface of the small bath 125 in the arrangement shown in FIG. 2, the arrangement is not limited thereto. The slit 126 may be so formed that the width thereof is gradually narrowed toward a lower side 126a (outlet) of the slit 126 as shown in FIG. 3. By thus arranging the shape of the slit 126, it becomes difficult for the air to be immixed inside the slit 126. Accordingly, even when a crystalline resin material is used as a raw material and molded into the sheet 21 at a high speed, the sheet 21 is free from generation of haze stripes, while realizing homogeneousness and non-orientation, so that the sheet 21 having excellent transparency and surface gloss can be manufactured. The resulting sheet 21 is excellent in uniformity without variation in thickness and wrinkles.

Furthermore, when the sheet is manufactured using the slit 126 having the arrangement as shown in FIG. 3, since usage amount of cooling fluid for cooling can be increased, cooling effect for cooling the melt-extruded sheet-like resin composition 20a can be enhanced. Accordingly, the sheet 21 can be molded at high speed. Here, in the slit 126 in FIG. 3, an inclination angle α formed by each slit wall 126b and the sheet-like resin composition 20a may set to any angle in the range above 0° to 30°.

The preheating unit 13 includes: first and third preheat rollers 131, 133 disposed in parallel to each other at a substantially uniform height; a second preheat roller 132 disposed between the preheat rollers 131, 133 at a position slightly lower than the preheat rollers 131, 133; and an auxiliary pressing roller 134 that rolls with its peripheral surface pressed by the third preheat roller 133, the auxiliary pressing roller 134 and the third preheat roller 133 holding the sheet 20 therebetween from upper and lower sides. The preheat rollers 131, 132, 133 each incorporate an electric heater or the like so that the peripheral surface thereof is heated to a desired temperature. A water drip may be provided between the first preheat roller 131 and the fourth roller 124 as needed.

With the arrangement described above, the cooled and solidified sheet 20 closely contact with the peripheral surfaces of the preheat rollers 131, 132, 133 so as to be preheated.

The heat treatment unit 14 includes first, second and third heating rollers 141, 142, 143, a cooling roller 144, an endless belt 145, an auxiliary pressing roller 146 and a peeling roller 147.

The first and third heating rollers 141, 142 and the cooling roller 144 are disposed in parallel to each other at a substantially uniform height, while the third roller 143 is disposed right below the heating roller 142 in parallel thereto.

The first to third heating rollers 141, 142, 142 each incorporate an electric heater or the like so that the peripheral surface thereof can be each heated to a temperature (e.g., approx. 100 to 160° C.) that is set to be equal to or lower than the melting point of the polypropylene resin (a). Meanwhile, the cooling roller 144 is so arranged as to allow the cooling water or the like to circulate, whereby the cooling roller 144 is cooled to a desired temperature.

The endless belt 145 is wound around the first and third heating rollers 141, 143 and the cooling roller 144 so that these rollers are disposed on the inner side of the endless belt 145. With the arrangement, the endless belt 145 is extended in a manner being pressed from the outer side toward the inner side by the second heating roller 142.

Incidentally, the outer surface of the endless belt 145 is provided with mirror finish. The thickness of the endless belt 145 may be in the range from 0.1 to 3.0 mm, preferably 0.4 mm to 1.5 mm.

A material of the endless belt 145 is preferably SUS301, SUS404, SUS316 or those equivalent to the above and metals such as a carbon copper and a titanium material may also be used.

The auxiliary pressing roller 146 rolls with the peripheral surface thereof being pressed against the above-described first heating roller 141 from the upper side thereof.

The peeling roller 147 peels the sheet 20 off from the endless belt 145, the peeling roller 147 being disposed in the vicinity of the cooling roller 144 with a predetermined distance.

With the arrangement, the preheated sheet 20 is pressed against the endless belt 145 due to rotations of the heating rollers 141, 142, 143 and the cooling roller 144, so that the sheet 20 is heated to a desired temperate while the mirror-finished surface of the endless belt 145 is transferred to the surface of the sheet 20.

The second cooling unit 15 includes: first, second and third cooling rollers 151, 152, 153 that are disposed in parallel to each other at a uniform height, each of the rollers 151, 152, 153 being cooled; and an auxiliary pressing roller 154 that is rolled while being pressed against the third cooling roller 153, the auxiliary pressing roller 154 and the third cooling roller 153 holding the sheet 20 therebetween.

However, a temperature of the peripheral surface of each cooling roller 151, 152, 153 is preferably set lower than that of the cooling roller 144.

With the arrangement, the heat-treated sheet 20 contacts with the peripheral surfaces of the cooling rollers 151, 152, 153, so that the sheet 20 is cooled while being moved.

In order to manufacture the transparent polypropylene based sheet 21 according to the present embodiment having the above-described arrangements, first, the resin composition as the raw material is melt-extruded from the T-die 112 by the extruding unit 11 into the sheet-like shape to obtain the sheet-like resin composition 20a (melt-extrusion step).

Next, the melt-extruded sheet-like resin composition 20a is introduced to the first cooling unit 12 to be cooled and solidified.

Specifically, the melt-extruded sheet-like resin composition 20a passes through the slit 126 (shown in FIG. 2, etc.) downward together with the cooling water that is constantly fed to the small bath 125. Then, the sheet-like resin composition 20a is introduced into the large bath 120, held between the first and second rollers 121, 122 to be sent to the third roller 123, and guided out of the large bath 120 by the fourth roller 124.

The melt-extruded sheet-like resin composition 20a is cooled and solidified while being moved in the large bath 120 and becomes the sheet-like article (sheet 20) (first cooling step).

Then, the cooled and solidified sheet 20 is introduced to the preheat unit 13 so as to be preheated to a predetermined temperature. Specifically, the sheet 20 is sent from the fourth roller 124 to the upper side of the peripheral surface of the first preheat roller 131, sent to the upper side of the peripheral surface of the third preheat roller 133 via the lower side of the peripheral surface of the second preheat roller 132, and then held between the third preheat roller 133 and the auxiliary pressing roller 134 so as to be sent out.

The sheet 20 is moved in a manner snaking up and down so as to be sufficiently pressed against the peripheral surfaces of the preheat rollers 131, 132, 133, so that the sheet 20 is effectively preheated to the predetermined temperature (preheating step).

Then, the preheated sheet 20 is introduced to the heat treatment unit 14 so as to be heat-treated with its surface smoothened.

Specifically, the sheet 20 is sent from the preheat roller 133 to the upper side of the peripheral surface of the first heating roller 141, and then pressed by and held between the auxiliary pressing roller 146 and the first heating roller 141 together with the endless belt 145, so that the sheet 20 is brought into close contact with the endless belt 145.

The sheet 20 is sent to the lower side of the second heating roller 142 along with the endless belt 145, and again pressed against the endless belt 145 by the second heating roller 142.

Subsequently, the sheet 20 is sent to the upper side of the cooling roller 144 together with the endless belt 145 and cooled by the cooling roller 144, and then guided by the peeling roller 147 to be peeled off from the endless belt 145.

With these members, the sheet 20 is sufficiently pressed against the mirror-finished endless belt 145 and the roller 142 under the condition in which the sheet 20 is heated to a temperature equal to or lower than the melting point of the polypropylene resin (a), whereby the mirror-finished surface of the endless belt 145 is transferred to the surface pressed thereagainst of the sheet 20, so that the smoothened sheet 21 can be obtained (heat treatment step).

Next, the heat-treated sheet 20 is introduced to the second cooling unit 15 to be cooled to a predetermined temperature.

Specifically, the sheet 20 is sent from the peeling roller 147 to the upper side of the peripheral surface of the first cooling roller 151, and sent to the third cooling roller 153 via the lower side of the peripheral surface of the second cooling roller 152 so as to be pressed by the auxiliary pressing roller 154.

Accordingly, the sheet 20 is sufficiently brought into contact with the cooling rollers 151, 152, 153 to be cooled (second cooling step).

Through the steps described above, the transparent polypropylene based sheet 21 of the present invention can be obtained.

With the transparent polypropylene based sheet 21 of the present invention that is obtained by the manufacturing method as described above, following advantages can be attained.

Specifically, the transparent polypropylene based sheet that is made of the resin composition containing the above-described specific polypropylene resin (a) and metallocene-type ethylene-α-olefin copolymer (b) is excellent in transparency, impact resistance (including impact resistance at a low temperature) and rigidity as well as being free from whitening in folding processing as secondary processing.

Especially, addition of the metallocene-type ethylene-α-olefin copolymer (b) (metallocene LL) is effective in enhancing the transparency. Addition of even a small adding amount of the metallocene-type ethylene-α-olefin copolymer (b) is effective, while addition of 10 mass % hardly degrades the rigidity. Accordingly, when the rigidity is especially required and therefore the adding amount is reduced, the transparency can be enhanced, while when the transparency is desired to be enhanced with higher priority and thus the adding amount is increased, degradation of the rigidity can be avoided.

Thus-obtained transparent polypropylene based sheet 21 preferably has a tensile modulus of elasticity in the extruding direction (MD direction) of the sheet 21 of 1500 MPa or higher. In the transparent polypropylene based sheet, the total haze H is preferably represented by Equation (I) shown below with the thickness of the sheet being t [mm].

Since such transparent polypropylene based sheet has excellent tensile characteristic and its total haze that is an indicator of the transparency of the sheet is in the range described below, the polypropylene based sheet having excellent transparency can be obtained.

$$H \leq 70t^2 - 30t + 6 \qquad (I)$$

When the total haze H is represented by Equation (II) shown below with the thickness of the sheet being t [mm], the transparent polypropylene based sheet having even more excellent transparency can be obtained.

(Equation 5)

$$H \leq 70t^2 - 30t + 5.2 \qquad (II)$$

The transparent polypropylene based sheet preferably has impact resistance at −5° C. of 2000 J/m or higher. Accordingly, the transparent polypropylene based sheet having excellent impact strength at a low temperature can be obtained, which is suitable as a packaging material used in a low temperature environment, i.e., a packaging body that is transported and stored at a low temperature.

According to the manufacturing method of the transparent polypropylene based sheet 21 of the present embodiment described above, the following advantages can be attained.

(1) The manufacturing method of the transparent polypropylene based sheet 21 of the present invention can prevent a so-called gum-like material from being generated in molding, thereby realizing proper continuous-productivity of the sheet.

(2) By heat-treating the cooled sheet 20 at a temperature equal to or lower than the melting point of the polypropylene resin (a), the rigidity is enhanced and the mirror finish or the like can be provided to the sheet 21, thereby enhancing the surface condition of the sheet 21.

(3) In the first cooling step, the melt-extruded sheet-like resin composition 20a is passed through the slit 126 through which the cooling water flows together with the cooling water so as to be directly water-cooled by the cooling water. Accordingly, the sheet-like resin composition 20a is cooled and solidified without generation of distortion to form the sheet 20.

(4) In the heat treatment step, since the front and back sides of the sheet 20 is held and heated between the endless belt 145 having the mirror-finished surface and the roller 142. With the arrangement, the heat transfers effectively and the heat treatment is sufficiently performed. Also, since the mirror-finished surface contacts with the sheet 20, the surface of the transparent polypropylene based sheet 21 can be properly mirror-finished.

(5) Since the polypropylene resin (a) and the metallocene system ethylene-α-olefin copolymer (b) constituting the resin composition does not contain the nucleating agent, proper moldability of the sheet 21 can be maintained.

Second Embodiment

Now, a second embodiment of the present invention will be described referring to FIG. 4. Incidentally, in the following description, the same reference numerals will be attached to the same portions and components as the above to omit the description thereof.

In the manufacturing machine 1 of the first embodiment described above, the first cooling unit 12 for cooling and solidified the melt-extruded sheet-like resin composition 20a to form the sheet 20 includes the large bath 120 and the small bath 125 having the slit 126.

Figure 4:
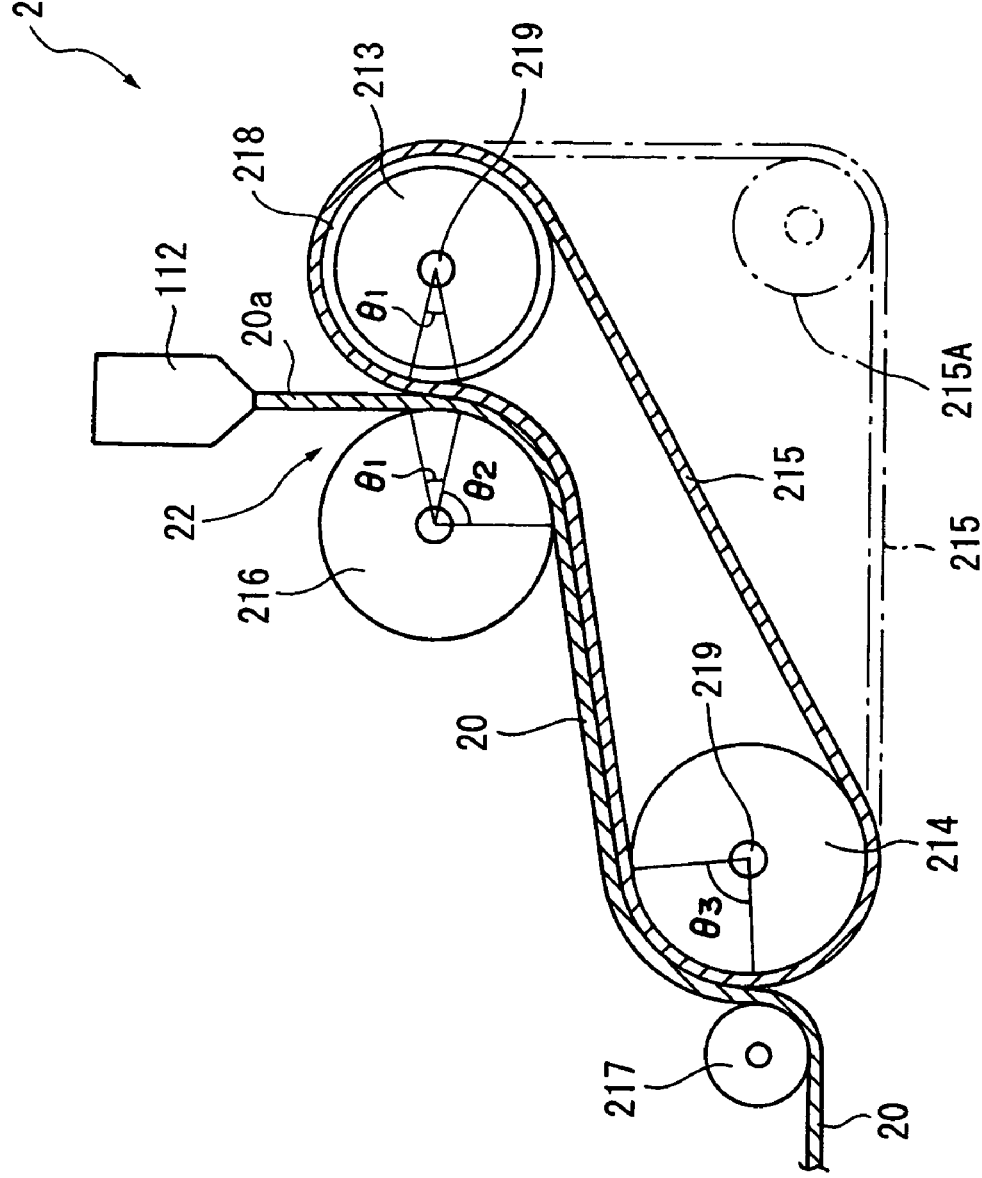
FIG. 4 is a diagram showing an outline of a manufacturing machine according to a second embodiment of the present invention.

On the other hand, in a manufacturing machine 2 of the transparent polypropylene based sheet of the second embodiment as shown in FIG. 4, a first cooling unit 22 includes: a metallic endless belt 215 wound around a first cooling roller 213 and a second cooling roller 214; a third cooling roller 216 that presses the melt-extruded sheet-like resin composition 20a against the first cooling roller 213 via the metallic endless belt 215; and a fourth cooling roller 217 that is disposed in the vicinity of the second cooling roller 214.

As shown by the dashed-dotted line in FIG. 4, another cooling roller 215A may be provided on the upper stream side of the first roller 213 in a manner contacting with the inner side of the endless belt 215 in order to further cool the endless belt 215.

The surface of the first cooling roller 213 of the manufacturing machine 2 shown in FIG. 4 is coated with an elastic member 218 such as a fluorocarbon rubber. The elastic member 218 has a hardness of 70 degrees or less (in compliance with JIS K6301A type) and a thickness of 3 mm or larger.

The metallic endless belt 215 is made of a stainless steel or the like and has a mirror-finished surface with a surface roughness of 0.5 S or less.

Then, a rotary shaft 219 of at least one of the first and second cooling rollers 213, 214 is connected to a rotation drive (not shown).

The third cooling roller 216 also has a mirror-finished surface with a surface roughness of 0.5 S or less. The cooling roller 216 presses the sheet-like resin composition 20a against the first cooling roller 213 via the metallic endless belt 215 in such a manner that the cooling roller 216 winds the sheet-like resin composition 20a that is pressed against the cooling roller 216 side by the endless belt 215.

In other words, the metallic endless belt 215 and the sheet-like resin composition 20a contacting with the endless belt 215 snake in a manner winding around a part of the peripheral surface of the third cooling roller 216.

The fourth roller 217 guides the sheet 20 so that the sheet 20 is pressed against the second cooling roller 214 via the endless belt 215.

The cooling rollers 213, 214, 216 are each provided with a temperature controller (not shown) such as a water-cooling type controller to control the temperature of the surface thereof.

In order to obtain the transparent propylene based sheet using the manufacturing machine 2 shown in FIG. 4, the melt-extrusion step is performed using the extruding unit 11 similarly to the first embodiment, and then the melt-extruded sheet-like resin composition 20a is introduced to the first cooling unit 22 to be cooled and solidified.

Specifically, it is preferable that the temperatures of the cooling rollers 213, 214, 216 are each controlled in advance so that the surface temperatures of the endless belt 215 and the third cooling roller 216 which directly contact with the melt-extruded sheet-like resin composition 20a are kept in the range from the dew point to 50° C.

Then, the sheet-like resin composition 20a that is melt-extruded by the T-die 112 of the extruder is introduced between the first and third cooling rollers 213, 216 in such a manner that the sheet-like resin composition 20a contacts with the endless belt 215 contacting with the first cooling roller 213 and with the third cooling roller 216 substantially simultaneously. The melt-extruded sheet-like resin composition 20a is pressed by the first and third cooling rollers 213, 216 so as to be cooled to, for instance, 50° C. or lower.

Here, the elastic member 218 is pressed and elastically deformed due to the pressing force acting between the first and third cooling rollers 213, 216. In angle θ1 portions from the centers of the rollers 213, 216 where the elastic member 218 is elastically deformed, the sheet-like resin composition 20a is planarly pressed by the rollers 213, 216. At this time, the contacting pressure is in the range from 0.1 MPa to 20.0 MPa.

Consequently, the sheet-like resin composition 20a is pressed against the third cooling roller 216 by the above-described endless belt 215 having the mirror-finished surface so as to be cooled to 50° C. or lower. The sheet-like resin composition 20a that is pressed against the cooling roller 216 side by the endless belt 215 is wound by the cooling roller 216 at an angle θ2 from the center of the cooling roller 216. The sheet-like resin composition 20a is planarly pressed by the endless belt 215 and the third cooling roller 216 at the winding angle θ2 portion. At this time, the contacting pressure is in the range from 0.01 MPa to 0.5 MPa.

Next, the cooled sheet 20 is moved toward the second cooling roller 214 along with the rotation of the endless belt 215 in a manner overlapping on and along the endless belt 215. The sheet 20 is pressed against the second cooling roller 214 via the endless belt 215 so as to be cooled to 50° C. or lower. The sheet 20 is guided by the fourth roller 217 and pressed against the cooling roller 214 side. At this time, the sheet 20 is planarly pressed by the endless belt 215 in an angle θ3 portion from the center of the cooling roller 214. At this time, the contacting pressure is in the range from 0.01 MPa to 0.5 MPa (first cooling step).

Thereafter, similarly to the first embodiment, the sheet 20 is subjected to the preheating step by the preheating unit 13, the heat treatment step by the heat treatment unit 14 and the second cooling step by the second cooling unit 15, so that the transparent polypropylene based sheet 21 of the present invention can be obtained.

Incidentally, the sheet 20 may be peeled off from the roller 216 instead of from the belt 215.

According to the second embodiment described above, the following advantages can be attained in addition to the advantages of the first embodiment (except (3)).

(6) The melt-extruded sheet-like resin composition 20a is planarly pressed and cooled by the first and third rollers 213, 216 in the angle θ1 portion of the rollers 213, 216 where the elastic member 218 is elastically deformed, the sheet-like resin composition 20a is planarly pressed and cooled by the metallic endless belt 215 and the third cooling roller 216 in the winding angle θ2 portion, and the sheet 20 is planarly pressed and cooled by the endless belt 215 and the second cooling roller 214 in the angle θ3 portion, by which the transparent polypropylene based sheet 21 having excellent transparency can be manufactured at high speed.

(7) Since quenching can be performed without using cooling water, production cost can be reduced.

Incidentally, the present invention is not limited to the embodiments described above, but includes modification and improvement as long as the object of the present invention can be attained.

For example, although the heat treatment step is performed using the endless belt 145 in the embodiments above, the arrangement is not limited thereto, and the heat treatment step may be performed by a metallic roller or the like.

The transparent polypropylene based sheet of the present invention may be manufactured by other manufacturing methods without limiting to the manufacturing method of the present invention. The transparent polypropylene based sheet of the present invention may contain other resins and additives such as a nucleating agent, an ultraviolet absorber, a colorant, an antistatic agent, etc.

Specific structures and shapes for implementing the present invention may be others as long as the object of the present invention can be attained.

EXAMPLE

Now, the present invention will be described in more detail with examples and comparisons. It should be noted that the present invention is not limited to details of the examples.

Examples 1 to 4, Comparisons 1 to 4

The transparent polypropylene based sheet 21 was manufactured using the manufacturing machine 1 (FIG. 1) of the first embodiment described above.

(Formula of Raw Material)

A specific condition of the material was as shown in Table 1 and the following description.

TABLE 1

| | | Ex. 1 | Ex. 2 | Ex. 3 | Ex. 4 | Comp. 1 | Comp. 2 | Comp. 3 | Comp. 4 |
|---|---|---|---|---|---|---|---|---|---|
| Material | HPP-1 | 87 | 87 | 77 | 87 | 87 | 97 | 87 | 97 |
| | HPP-2 | 3 | 3 | 3 | 3 | 3 | 3 | 3 | 3 |
| | Metallocene LL-1 | 10 | — | 20 | 10 | — | — | — | — |
| | Metallocene LL-2 | — | 10 | — | — | — | — | — | — |
| | L-LDPE | — | — | — | — | 10 | — | 10 | — |
| Thickness (mm) | | 0.3 | 0.3 | 0.3 | 0.4 | 0.3 | 0.3 | 0.4 | 0.4 |

Resin materials in the table are as follows.

Incidentally, the density and the melt flow rate (MFR) of the resin material were measured respectively in compliance with JIS K7112 (23° C.) and JIS K7210.

Homopolypropylene-1 (HPP-1):

Grade: E-304GP (manufactured by Idemitsu Kosan Co., Ltd.)

Isotactic pentad fraction: 0.90

MFR: 3.0 g/10 min

Homopolypropylene-2 (HPP-2):

Grade: F-534N4 (manufactured by Idemitsu Kosan Co., Ltd.)

Isotactic pentad fraction: 0.92

MFR: 2.0 g/10 min

Metallocene-system ethylene-α-olefin copolymer-1 (metallocene LL-1):
Grade: COLONEL KF370 (manufactured by Japan Polyethylene Corporation)
Density: 905 kg/m$^3$
MFR: 3.5 g/10 min
Metallocene-system ethylene-α-olefin copolymer-2 (metallocene LL-2):
Grade: UMERIT 0540F (manufactured by UBE INDUSTRIES LTD.)
Density: 904 kg/m$^3$
MFR: 4.0 g/10 min
Linear low-density polyethylene (L-LDPE):
Grade: V0398CN (manufactured by Idemitsu Kosan Co., Ltd.)
Density: 907 kg/m$^3$
MFR: 3.0 g/10 min The isotactic pentad fraction described above was a value measured as follows.

Specifically, 13C-NMR measurement was performed using JNM-FX-200 (manufactured by JEOL Ltd., 13C-nuclear resonance frequency: 50.1 MHz) under the following conditions: measurement mode being complete proton decoupling method; pulse width being 6.9 μs (45°); pulse repetition time being 3 seconds; number of integrations being 10000 times; solvent being 1,2,4-trichlorobenzene/Benzene-d6 ($C_6H_6[^2H_6]$) (90/10 vol %), sample concentration 250 mg/2.5 ml solvent; and measuring temperature being 130° C. The pentad fraction was measured from difference in chemical shift due to stereoregularity of a methyl group, i.e., from an area intensity ratio of each peak in mmmm to mrrm appeared in a region of 22.5 to 19.5 ppm, thereby obtaining the isotactic pentad fraction.

mmmm: 21.86 ppm
mmmr: 21.62 ppm
mmrr: 21.08 ppm
mmrm+rrmr: 20.89 ppm
rrrr: 20.36 ppm
mrrm: 19.97 ppm (Manufacturing Method)

The resin compositions prepared with the formulae shown in Table 1 were each extruded into a sheet-like resin composition using the manufacturing machine 1 as shown in FIG. 1 (including a T-die extruder, a cooling device and a heat treatment device) under the conditions of: a resin temperature of 240° C.; and a die lip temperature of 280° C. The sheet-like resin composition was introduced into a slit through which cooling water flows to be quenched in a bath (water temperature: 10° C.), preheated by a roller heated to 110° C. and heat-treated by a roller and a mirror-finished endless belt each heated to 145° C. to obtain a transparent polypropylene based sheet at a speed of 15 m/min.

(Test Condition)

As properties of each of the transparent polypropylene based sheets obtained from examples and comparisons, (1) tensile characteristic, (2) haze, (3) glossiness, (4) impact strength and (5) whitening in folding were measured under conditions below, and then compared and evaluated.

Also, as (6) continuous productivity, generation of a gum-like material in molding of the transparent polypropylene based sheet was judged by conditions below, and then compared and evaluated. The test results are shown in Table 2.

(1) Tensile Characteristic

As the tensile characteristic, "tensile characteristic", "yield strength", "fracture strength" and "elongation" were measured in compliance with JIS K7113, and then compared and evaluated.

The measurement was performed in an extruding direction (MD direction) and a direction perpendicular to the MD direction (TD direction).

(2) Haze

The haze was measured using haze measuring equipment (manufactured by Nippon Denshoku Industries Co., Ltd.) in compliance with JIS K7105. The total haze and an internal haze were measured as the haze.

Incidentally, the total haze H obtained by Equation (I) with the thickness being 0.3 mm is 3.3.

(3) Glossiness

The glossiness was measured using an automatic color-measuring color-difference meter (manufactured by SUGA TEST INSTRUMENTS Co., Ltd.) in compliance with JIS K7105 (front side: roller side, back side: belt side).

(4) Impact Strength

The impact strength was measured using Film Impact Tester (manufactured by Toyo Seiki Seisaku-Sho, Ltd.) under the conditions of: test load of 30 kg; 1 inch head; and at 5° C., −5° C.

(5) Whitening in Folding

The sheet was folded and straightened by fingers and generation of a white line was visually observed.

(6) Continuous Productivity

As the continuous productivity, adhesion of the gum-like material (resin adhesive material) to the die lips in a 48-hour continuous production was checked, which was judged based on the following criteria and then compared and evaluated.

Judging Criteria

☉: almost no gum-like material was generated for 48 hours.
○: a gum-like material was generated when 10 hours have elapsed.
Δ: a gum-like material was generated when 3 hours have elapsed.

(Test Result)

The test results are shown in Table 2.

TABLE 2

| | | | Ex. 1 | Ex. 2 | Ex. 3 | Ex. 4 | Comp. 1 | Comp. 2 | Comp. 3 | Comp. 4 |
|---|---|---|---|---|---|---|---|---|---|---|
| Tensile characteristics | Tensile elasticity (MPa) | MD | 1890 | 1960 | 1650 | 2020 | 1880 | 1910 | 1740 | 2090 |
| | | TD | 1890 | 1860 | 1650 | 1880 | 1840 | 1920 | 1700 | 2030 |
| | Yield strength (MPa) | MD | 31.4 | 31.6 | 28.3 | 33.8 | 31.6 | 33.3 | 31.6 | 35.3 |
| | | TD | 29.4 | 29.5 | 26.5 | 31.2 | 29.6 | 32.1 | 30.1 | 34 |
| | Fracture strength (MPa) | MD | 57.2 | 57.5 | 57.2 | 58.6 | 55.6 | 51.3 | 48.9 | 52.2 |
| | | TD | 43.8 | 44.3 | 43.8 | 46.6 | 44.4 | 47.3 | 40.4 | 46.9 |

TABLE 2-continued

|  |  | Ex. 1 | Ex. 2 | Ex. 3 | Ex. 4 | Comp. 1 | Comp. 2 | Comp. 3 | Comp. 4 |
|---|---|---|---|---|---|---|---|---|---|
| Elongation (%) | MD | 454 | 460 | 456 | 447 | 465 | 386 | 450 | 437 |
|  | TD | 413 | 422 | 416 | 406 | 436 | 439 | 395 | 433 |
| Haze (%) | Total | 2.1 | 2.3 | 1.8 | 4.8 | 3.5 | 3 | 6.9 | 7.3 |
|  | Inner | 1 | 1.1 | 0.6 | 3.5 | 2.3 | 2.3 | 5.6 | 5.5 |
| Glossiness (%) | Front | 141 | 140 | 138 | 133 | 139 | 145 | 135 | 133 |
|  | Back | 135 | 134 | 132 | 125 | 133 | 140 | 134 | 128 |
| Impact strength | 5° C. | ≧5920 | ≧4840 | ≧5080 | 3940 | ≧5840 | 2090 | 3020 | 2390 |
| (J/m) | −5° C. | 2080 | 2070 | 7060 | 2548 | 2080 | 1740 | 2230 | 1280 |
| Whitening in folding |  | OK | OK | OK | OK | OK | OK | OK | OK |
| Continuous moldability |  | ◎ | ◎ | ◎ | ◎ | Δ | ◎ | Δ | ◎ |

As shown in Table 2, the polypropylene based sheets of Examples 1 to 4 containing the specific polypropylene resin (a) and the specific metallocene-type ethylene-α-olefin copolymer (b) each showed good tensile characteristic and rigidity, greatly-improved transparency, while being excellent in glossiness, impact resistance including impact resistance at a low temperature and whitening property in folding.

In addition, when manufacturing the polypropylene based sheets of Examples 1 to 4, the gum-like material is hardly generated on the die lips, so that it was verified that the manufacturing methods of Examples 1 to 4 also realized excellent continuous productivity.

Examples 5 to 8, Comparisons 5 to 6

The transparent polypropylene based sheet 21 was manufactured using the manufacturing machine 2 (FIG. 4) of the second embodiment described above.

(Formula of Raw Material)

The formulae of the materials were as shown in Table 3. Details of materials in Table 3 were the same as those described in Examples 1 to 4.

TABLE 3

|  |  | Ex. 5 | Ex. 6 | Ex. 7 | Ex. 8 | Comp. 5 | Comp. 6 |
|---|---|---|---|---|---|---|---|
| Material | HPP-1 | 90 | 95 | 99 | 99.5 | 100 | 90 |
|  | HPP-2 | — | — | — | — | — | — |
|  | Metallocene LL-1 | 10 | 5 | 1 | 0.5 | — | — |
|  | Metallocene LL-2 | — | — | — | — | — | — |
|  | L-LDPE | — | — | — | — | — | 10 |
| Thickness (mm) |  | 0.3 | 0.3 | 0.3 | 0.3 | 0.3 | 0.3 |

(Manufacturing Method)

The resin compositions prepared with the formulae shown in Table 3 were each extruded using the manufacturing machine 2 as shown in FIG. 4 (including a T-die extruder, a belt/roller quenching device) into a sheet-like resin composition with a resin temperature of 240° C. and a die lip temperature of 280° C. The sheet-like resin composition was quenched by a belt (temperature; 15° C.) to obtain a transparent sheet of 0.3 mm thick at a speed of 4 m/min. Next, the obtained sheet was heat-treated in a constant-temperature bath (oven) of 190° C. for 20 seconds to obtain a transparent polypropylene based sheet.

(Test Condition)

Under the same conditions as those in Examples 1 to 4, the total haze before and after the heat treatment was measured for each of the transparent polypropylene based sheet.

(Test Result)

The test results are shown in Table 4.

TABLE 4

| Haze (%) (Total haze) | Ex. 5 | Ex. 6 | Ex. 7 | Ex. 8 | Comp. 5 | Com. 6 |
|---|---|---|---|---|---|---|
| Before treatment | 3.4 | 3.1 | 2.3 | 2.3 | 2.1 | 5.3 |
| After treatment | 0.9 | 1.1 | 1.1 | 1.1 | 1.1 | 1.7 |

As is evident from Table 4, the sheet having higher content of the metallocene-type ethylene-α-olefin copolymer (b) tends to cause lower transparency before the heat treatment. However, it is apparent that the resulting sheets after the heat treatment have improved and almost equal transparency.

Such advantages of the present invention cannot be realized by an ethylene-α-olefin copolymer prepared using a non-uniform Ziegler catalyst.

INDUSTRIAL APPLICABILITY

The manufacturing method of the transparent polypropylene based sheet and the transparent polypropylene based sheet of the present invention are widely applicable to stationary materials such as transparent folders and various packaging materials such as packaging materials for articles transported and stored at a low temperature and a packaging case (foldable cases, etc.) as well as manufacturing methods thereof.

The invention claimed is:

1. A manufacturing method of a transparent polypropylene based sheet that uses a resin composition containing: 70 to 99.8 mass % of a polypropylene resin (a) having an isotactic pentad fraction of 0.85 to 0.99 and a melt flow rate (MFR) of 0.1 to 30 g/10 min; and 30 to 0.02 mass % of a metallocene-type ethylene-α-olefin copolymer (b) that is produced using a metallocene catalyst and having a density of 880 to 920 kg/m³ and a melt flow rate (MFR) of 1 to 30 g/10 min, the method comprising:
    a melt extrusion step for melt-extruding the resin composition into a sheet-like shape;
    a cooling step for quenching the melt-extruded sheet-like resin composition to obtain a sheet-like article; and
    a heat treatment step for heat-treating the quenched sheet-like article at a heat treatment temperature of 100 to 220° C.

2. The manufacturing method according to claim 1, wherein the polypropylene resin (a) and the metallocene-type ethylene-α-olefin copolymer (b) do not contain a nucleating agent.

3. The manufacturing method according to claim 2, wherein the cooling step includes at least one of:

quenching the melt-extruded sheet-like resin composition by allowing the sheet-like resin composition to pass through a slit through which cooling water flows; and quenching the melt-extruded sheet-like resin composition by allowing the sheet-like resin composition sheet to travel between and in contact with a cooling roller and an endless belt.

4. The manufacturing method according to claim 3, wherein, in the heat treatment step, front and back surfaces of the sheet-like article are held with a metallic endless belt and/or a metallic roller to heat the sheet-like article, the metallic endless belt and/or the metallic roller having a mirror-finished surface.

5. The manufacturing method according to claim 2, wherein, in the heat treatment step, front and back surfaces of the sheet-like article are held with a metallic endless belt and/or a metallic roller to heat the sheet-like article, the metallic endless belt and/or the metallic roller having a mirror-finished surface.

6. The manufacturing method according to claim 1, wherein the cooling step includes at least one of:

quenching the melt-extruded sheet-like resin composition by allowing the sheet-like resin composition to pass through a slit through which cooling water flows; and quenching the melt-extruded sheet-like resin composition by allowing the sheet-like resin composition sheet to travel between and in contact with a cooling roller and an endless belt.

7. The manufacturing method according to claim 6, wherein, in the heat treatment step, front and back surfaces of the sheet-like article are held with a metallic endless belt and/or a metallic roller to heat the sheet-like article, the metallic endless belt and/or the metallic roller having a mirror-finished surface.

8. The manufacturing method according to claim 1, wherein, in the heat treatment step, front and back surfaces of the sheet-like article are held with a metallic endless belt and/or a metallic roller to heat the sheet-like article, the metallic endless belt and/or the metallic roller having a mirror-finished surface.

9. The manufacturing method according to claim 1, wherein the resin composition contains 5 to 25 mass % of a metallocene-type ethylene-α-olefin copolymer (b) that is produced using a metallocene catalyst and having a density of 880 to 920 kg/m$^3$ and a melt flow rate (MFR) of 1 to 30 g/10 min.

10. The manufacturing method according to claim 1, wherein the resin composition contains 5 to 30 mass % of a metallocene-type ethylene-α-olefin copolymer (b) that is produced using a metallocene catalyst and having a density of 880 to 920 kg/m$^3$ and a melt flow rate (MFR) of 1 to 30 g/10 min.

11. The manufacturing method according to claim 1, wherein the resin composition contains 3 to 30 mass % of a metallocene-type ethylene-α-olefin copolymer (b) that is produced using a metallocene catalyst and having a density of 880 to 920 kg/m$^3$ and a melt flow rate (MFR) of 1 to 30 g/10 min.

12. The manufacturing method according to claim 1, wherein the transparent polypropylene based sheet has an impact resistance at −5° C. of 2000 J/m or higher.

13. The manufacturing method according to claim 1, wherein the resin composition contains 70 to 97 mass % of a polypropylene resin (a) having an isotactic pentad fraction of 0.85 to 0.99 and a melt flow rate (MFR) of 0.1 to 30 g/10 min.

14. The manufacturing method according to claim 1, wherein the resin composition contains 75 to 95 mass % of a polypropylene resin (a) having an isotactic pentad fraction of 0.85 to 0.99 and a melt flow rate (MFR) of 0.1 to 30 g/10 min.

15. The manufacturing method according to claim 1, wherein the metallocene-type ethylene-α-olefin copolymer has a molecular weight distribution ($M_w/M_n$) obtained by a gel permeation chromatography method in the range from 1.5 to 4.0.

16. The manufacturing method according to claim 1, wherein heat treatment temperature is 100° C. to the melting point of the polypropylene resin.

17. The manufacturing method according to claim 1, wherein the resin composition contains 75 to 95 mass % of a polypropylene resin (a) having an isotactic pentad fraction of 0.85 to 0.99 and a melt flow rate (MFR) of 0.1 to 30 g/10 min and 5 to 25 mass % of a metallocene-type ethylene-α-olefin copolymer (b) that is produced using a metallocene catalyst and having a density of 880 to 920 kg/m$^3$ and a melt flow rate (MFR) of 1 to 30 g/10 min.

18. The manufacturing method according to claim 17, wherein the transparent polypropylene based sheet has an impact resistance at −5° C. of 2000 J/m or higher.

\* \* \* \* \*